(12) United States Patent
Hermant et al.

(10) Patent No.: US 10,421,269 B2
(45) Date of Patent: Sep. 24, 2019

(54) POLYMERS AS SUPPORT MATERIAL FOR USE IN FUSED FILAMENT FABRICATION

(71) Applicant: BASF SE, Ludwigshafen (DE)

(72) Inventors: Marie-Claire Hermant, Mannheim (DE); Nikolaus Nestle, Heidelberg (DE); Stephan Hueffer, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 321 days.

(21) Appl. No.: 15/120,051

(22) PCT Filed: Feb. 17, 2015

(86) PCT No.: PCT/EP2015/053300
§ 371 (c)(1),
(2) Date: Aug. 18, 2016

(87) PCT Pub. No.: WO2015/124557
PCT Pub. Date: Aug. 27, 2015

(65) Prior Publication Data
US 2017/0057176 A1 Mar. 2, 2017

(30) Foreign Application Priority Data
Feb. 19, 2014 (EP) .................................... 14155724

(51) Int. Cl.
| | |
|---|---|
| *B29C 67/00* | (2017.01) |
| *B33Y 70/00* | (2015.01) |
| *B33Y 10/00* | (2015.01) |
| *C08F 218/08* | (2006.01) |
| *C08F 226/10* | (2006.01) |
| *B29C 64/106* | (2017.01) |
| *B29C 64/40* | (2017.01) |
| *B29C 64/118* | (2017.01) |
| *C08F 218/10* | (2006.01) |
| *C08F 226/06* | (2006.01) |
| *B29K 105/08* | (2006.01) |

(52) U.S. Cl.
CPC ............ *B33Y 70/00* (2014.12); *B29C 64/106* (2017.08); *B29C 64/40* (2017.08); *B33Y 10/00* (2014.12); *C08F 218/08* (2013.01); *C08F 226/10* (2013.01); *B29C 64/118* (2017.08); *B29K 2105/08* (2013.01); *B29K 2839/06* (2013.01); *C08F 218/10* (2013.01); *C08F 226/06* (2013.01)

(58) Field of Classification Search
CPC ..... B29C 64/40; B29C 64/106; B29C 64/118; B33Y 70/00; B33Y 10/00; C08F 226/10; C08F 226/06; C08F 218/08; C08F 218/10; B29K 2839/06
See application file for complete search history.

(56) References Cited

U.S. PATENT DOCUMENTS

| | | | |
|---|---|---|---|
| 5,121,329 A | 6/1992 | Crump | |
| 5,503,785 A | 4/1996 | Crump et al. | |
| 6,790,403 B1 | 9/2004 | Priedeman, Jr. | |
| 6,803,405 B1 | 10/2004 | Schnell et al. | |
| 2007/0228590 A1* | 10/2007 | LaBossiere ......... | B29C 47/0002 264/40.1 |
| 2010/0096072 A1 | 4/2010 | Hopkins et al. | |
| 2013/0156952 A1 | 6/2013 | Keinath | |
| 2013/0317164 A1 | 11/2013 | Hermes et al. | |
| 2014/0162033 A1* | 6/2014 | Giller ................. | B29C 67/0059 428/207 |
| 2015/0210016 A1* | 7/2015 | Okamoto ............ | B29C 67/0092 428/206 |

FOREIGN PATENT DOCUMENTS

| | | | | |
|---|---|---|---|---|
| CA | 2152038 A1 * | 12/1995 | ............ | C08F 218/08 |
| EP | 0 545 209 A1 | 6/1993 | | |

(Continued)

OTHER PUBLICATIONS

Wikipedia, Polyvinylpyrrolidone, 2013, https://en.wikipedia.org/wiki/Polyvinylpyrrolidone, all pages (Year: 2013).*

(Continued)

*Primary Examiner* — Anthony Calandra
*Assistant Examiner* — Jerzi H Moreno Hernandez
(74) *Attorney, Agent, or Firm* — Oblon, McClelland, Maier & Neustadt, L.L.P.

(57) ABSTRACT

The present invention relates to the use of a polymer comprising polymerized units (A) and (B): (A) at least one first monomer of the formula (I) where n is 3 to 12; m is 0 to 3; $R^1$ is $C_1$-$C_{10}$-alkyl, $C_2$-$C_{10}$-alkenyl, aryl or aralkyl; $R^2$, $R^3$ and $R^4$ are each, independently of one another, hydrogen, $C_1$-$C_{10}$-alkyl, $C_2$-$C_{10}$-alkenyl, aryl or aralkyl; and (B) at least one second monomer of the formula (II) where $R^5$, $R^6$ and $R^7$ are each, independently of one another, hydrogen, $C_1$-$C_{10}$-alkyl, $C_2$-$C_{10}$-alkenyl, aryl or aralkyl; $R^8$ is $C_1$-$C_{20}$-alkyl, $C_2$-$C_{10}$alkenyl, aryl or aralkyl; as a support material in a fused filament fabrication process.

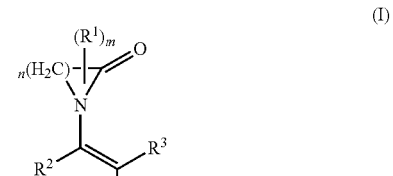

(I)

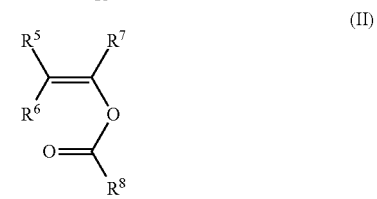

(II)

15 Claims, No Drawings

(56) References Cited

FOREIGN PATENT DOCUMENTS

| EP | 0 688 799 A1 | 12/1995 |
| WO | WO 2010/045147 A2 | 4/2010 |
| WO | WO 2012/028308 A1 | 3/2012 |
| WO | WO 2012/143182 A1 | 10/2012 |

OTHER PUBLICATIONS

International Search Report dated Apr. 8, 2015 in PCT/EP2015/053300.

* cited by examiner

POLYMERS AS SUPPORT MATERIAL FOR USE IN FUSED FILAMENT FABRICATION

The present invention relates to the use of a polymer as a support material in a fused filament fabrication process and to a process for producing three-dimensional objects by a fused filament fabrication process.

A task often encountered in very recent times is the rapid production of prototypes. Rapid prototyping or rapid manufacturing processes are processes for fabrication designed to transpose existing three-dimensional computer-aided design data (CAD), ideally without a manual diversion of forming directly and rapidly into work pieces.

For rapid prototyping different processes are known which can be subdivided into laser-based processes and processes without the use of a laser.

Stereolithography is a laser-based process wherein a curable liquid composition is cured with a laser layer by layer. As curable liquid composition for example monomers or monomer mixtures are used. The polymerization of said monomers is induced by means of an UV-laser.

A similar process is the selective laser sintering (SLS) process. In this process the laser selectively fuses powdered material, for example a thermoplastic polymer powder, by scanning cross-sections generated from a 3-D digital description of the part (for example from a CAD file or scan data) on the surface of a powder bed. After each cross-section is scanned, the powder bed is lowered by one layer thickness, a new layer of powder material is applied on top, and the process is repeated until the part is completed.

The aforementioned laser-based processes are costly as the use of high power lasers (for example, a carbon dioxide laser) is involved.

More economical is the fused filament fabrication process (FFF) also known as fused deposit modeling (FDM). The fused filament fabrication process is an additive manufacturing technology. A three-dimensional object is produced by extruding a thermoplastic material through a nozzle to form layers as the thermoplastic material hardens after extrusion. A plastic filament is unwound from a coil and supplies thermoplastic material to the extrusion nozzle which can be turned on or off to control the flow. There is typically a worm-drive that pushes the filament into the nozzle at a controlled rate. The nozzle is heated to heat the thermoplastic material past its melting and/or glass transition temperature and is then deposited by the extrusion head on a base to form a three-dimensional object in a layer-wise fashion. The thermoplastic material is typically selected and its temperature is controlled so that it solidifies substantially immediately upon extrusion or dispensing onto the base, with the buildup of multiple layers to form the desired three-dimensional object. The thermoplastic material is also denominated as modeling material.

In order to form each layer, drive motors are provided to move the base and/or the extrusion nozzle (dispending head) relative to each other in a predetermined pattern along the X-, Y- and Z-axis. The FFF process was first described in U.S. Pat. No. 5,121,329.

For the production of three-dimensional objects having complex shapes, for example overhangs or narrow cavities, typically a support material must be used underneath overhanging parts or in cavities of the three-dimensional object under construction, which are not directly supported by the modeling material itself. The support material is typically dispensed by a separate extrusion nozzle. The support material is chosen so that it adheres to the modeling material. After finishing the FFF process the support material has to be removed in order to obtain the three-dimensional object manufactured from the modeling material.

The support material should ideally have a high glass transition temperature similar to the glass transition temperature of the modeling material and should be easy removable from the three-dimensional object after manufacturing. Moreover, the support material should be compatible with the modeling material. The FFF process is normally carried out in a build chamber. For certain FFF processes the utilized build chamber can have raised temperatures to improve the quality of the print process. The temperature in the build chamber is typically in the range of 20 to 80° C. and normally in the range of 60 to 80° C. The support material should preferably have a glass transition temperature (Tg) above the temperature in the build chamber. The support material should not deform at the temperature of the build chamber.

U.S. Pat. No. 6,790,403 B1 describes a FFF process for making a three-dimensional object by dispensing a solidifiable modeling material in a predetermined pattern in order to define the three-dimensional object in coordination with dispensing a solidifiable support material so as to define the support structure for the three-dimensional object. According to U.S. Pat. No. 6,790,403 B1 as a modeling material preferably an acrylonitrile-butadiene-styrene (ABS) composition is used. The support material is preferably a thermoplastic polymer comprising a base polymer containing carboxylic acid and a plasticizer. The modeling material is alkali-soluble and can be removed by placing the object in a strong alkaline bath.

WO 2010/045147 also describes a FFF process, wherein a support material is used. The support material is a copolymer comprising carboxyl groups and phenyl groups as well as a polymeric impact modifier. The support material is removed from the three-dimensional object with a strong alkaline aqueous solution.

U.S. Pat. No. 5,503,785 describes a FFF process wherein between the modeling material and the support material a thin film of a release material is deposited in order to minimize the interfacial bond strength between the modeling material and the support material. In one embodiment as modeling and support material the same polymers are used. As a release material water soluble polymers are used, for example polyethylene oxide and glycol-based polymers; polyvinyl pyrrolidone-based polymers; methyl vinyl ether, and maleic acid-based polymers; polyoxazoline-based polymers; and polyquaterniums. As a modeling material a thermoplastic polyamide polymer is utilized. The FFF process according to U.S. Pat. No. 5,503,785 is rather complicated as three different materials have to be used, namely the modeling material, the release material and the support material.

WO 2012/143182 describes a support material for a FFF process based on a copolymer comprising maleic anhydride and a further appropriate monomer like styrene or isobutylene. Subsequently the support material is removed from the three-dimensional object by means of an alkaline aqueous solution.

The handling of alkaline solutions is not trivial, and presents a large hurdle for the implementation of such support materials in FFF processes. The support materials described in the prior art do not at one and the same time meet the above stated requirements of a high glass transition temperature, good compatibility with the modeling material and easy removability.

The object underlying the present invention is therefore to provide improved support materials for a fused filament fabrication (FFF) process, which does not have the above-mentioned disadvantages of the prior art or has them only to a significantly reduced extent. A second object underlying the present invention is to provide a fused filament fabrication (FFF) process, which process should be carried out more simply, safer and more cost efficient than described in the state of the art.

The object is achieved by the use of a polymer comprising polymerized units (A) and (B):

(A) at least one first monomer of the formula (I):

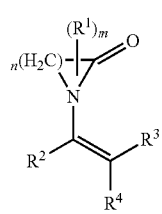

(I)

where
n is 3 to 12;
m is 0 to 3;
$R^1$ is $C_1$-$C_{10}$-alkyl, $C_2$-$C_{10}$-alkenyl, aryl or aralkyl;
$R^2$, $R^3$ and $R^4$ are each, independently of one another, hydrogen, $C_1$-$C_{10}$-alkyl, $C_2$-$C_{10}$-alkenyl, aryl or aralkyl; and (B) at least one second monomer of the formula (II)

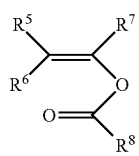

(II)

where
$R^5$, $R^6$ and $R^7$ are each, independently of one another, hydrogen, $C_1$-$C_{10}$-alkyl, $C_2$-$C_{10}$-alkenyl, aryl or aralkyl;
$R^8$ is $C_1$-$C_{20}$-alkyl, $C_2$-$C_{10}$-alkenyl, aryl or aralkyl;
as a support material in a fused filament fabrication process.

The support material used in a FFF process according to the present invention meets at one and the same time the requirements of a high glass transition temperature similar to that of the modeling material, a good compatibility with the modeling material and a superior removability subsequent to the production of the three-dimensional object made from the modeling material.

The term "modeling material" according to the present invention describes the material out of which the three-dimensional object itself is manufactured by the FFF process.

The term "support material" according to the present invention describes the material which forms a support structure for overhangs or narrow cavities and the like of the three-dimensional object made from the modeling material during the FFF process.

The support material is subsequently removed to obtain the finished three-dimensional object itself made from the modeling material. In other words the support material is used as a sacrificial material which is removed after the FFF process.

The support material used according to the present invention shows a good compatibility with the modeling material and with the FFF process. The support material, moreover, is soluble in water and does not require a strong alkaline aqueous solution for removal.

The FFF process for the production of three-dimensional objects is well known in the state of the art and detailed explained in the above cited documents. The FFF process is also denominated as 3D printing process.

An FFF-process (fused filament fabrication process) for the purpose of the present invention is a process in which at least one modeling material and at least one support material are each initially present in a solid state and thereafter melted and printed to form an three-dimensional object comprising the modeling material, which is supported by the support material. Subsequently the support material is removed by dissolving to obtain the three-dimensional object itself.

Another object of the present invention is therefore a process for producing a three-dimensional object by a fused filament fabrication process comprising the steps:

i) depositing a support material into a build chamber using a layer-based additive technique to form a support structure,
ii) depositing a modeling material into the build chamber using the layer-based additive technique to form the three-dimensional object, wherein the three-dimensional object comprises at least one region supported by the support structure and
iii) removing the support structure from the three-dimensional object with an aqueous solution, wherein the support material comprises a polymer comprising polymerized units (A) and (B):

(A) at least one first monomer of the formula (I):

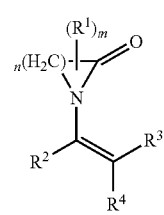

(I)

where
n is 3 to 12;
m is 0 to 3;
$R^1$ is $C_1$-$C_{10}$-alkyl, $C_2$-$C_{10}$-alkenyl, aryl or aralkyl;
$R^2$, $R^3$ and $R^4$ are each, independently of one another, hydrogen, $C_1$-$C_{10}$-alkyl, $C_2$-$C_{10}$-alkenyl, aryl or aralkyl; and (B) at least one second monomer of the formula (II)

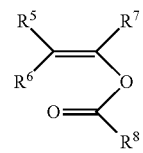

(II)

where
$R^5$, $R^6$ and $R^7$ are each, independently of one another, hydrogen, $C_1$-$C_{10}$-alkyl, $C_2$-$C_{10}$-alkenyl, aryl or aralkyl;
$R^8$ is $C_1$-$C_{20}$-alkyl, $C_2$-$C_{10}$-alkenyl, aryl or aralkyl.

The "layer-based additive technique" for the purpose of the present invention is a technique, wherein a first layer of material is deposited on a base in a build chamber to form a first layer of material, followed by the deposition of a second layer of material on the first layer of material, followed by the deposition of a third layer of material and so on. The number of layers deposited by the layer-base additive technique depends on the size of the three-dimensional object and the support structure respectively. Moreover, the number of layers depends on the thickness of the layers deposited.

Modeling Material

As modeling material generally thermoplastic materials comprising a thermoplastic polymer are used. Accordingly any thermoplastic material capable of being extruded may be used.

Suitable modeling materials are well known and detailed explained in the above cited documents. Suitable modeling materials according to the invention have generally glass transition Temperatures in the range of 20 to 350° C., preferably in the range of 30 to 250° C., more preferably in the range of 40 to 200° C. and particularly in the range of 50 to 200° C.

Glass transition temperatures for the purpose of the invention are measured by differential scanning calorimetry (DSC) according to DIN 53765.

Suitable modeling materials are for example thermoplastic polymers selected from the group consisting of polyolefines like polyethylene or polypropylene, acrylonitrile-butadiene-styrene (ABS) copolymers, polycarbonates, polyamides, polylactic acids and blends of the aforementioned polymers.

Support Material

According to the invention a support material is used which comprises a polymer comprising polymerized units (A) and (B).

Within the context of the present invention, definitions such as $C_1$-$C_{10}$-alkyl, as for example defined above for the radicals $R^1$, $R^2$ and $R^3$ in formula (I) and $R^5$, $R^6$, $R^7$ and $R^8$ in formula (II), mean that this substituent (radical) is an alkyl radical with a carbon atom number from 1 to 10. The alkyl radical may be linear or branched and also optionally cyclic. Alkyl radicals which have both a cyclic component and also a linear component likewise fall under this definition.

Within the context of the present invention, definitions such as $C_1$-$C_{20}$-alkyl, as for example defined above for the radical $R^8$ in formula (II), mean that this substituent (radical) is an alkyl radical with a carbon atom number from 1 to 20. The alkyl radical may be linear or branched and also optionally cyclic. Alkyl radicals which have both a cyclic component and also a linear component likewise fall under this definition.

The alkyl radicals can optionally also be mono- or polysubstituted with functional groups such as amino, amido, ether, vinyl ether, isoprenyl, hydroxy, mercapto, carboxyl, halogen, aryl or heteroaryl. Unless stated otherwise, the alkyl radicals preferably have no functional groups as substituents. Examples of alkyl radicals are methyl, ethyl, n-propyl, sec-propyl, n-butyl, sec-butyl, isobutyl, 2-ethylhexyl, tertiary-butyl (tert-bu/t-Bu), pentyl, hexyl, heptyl, cyclohexyl, octyl, nonyl, decyl, undecyl, dodecyl, tridecyl, tetradecyl, pentadecyl, hexadecyl, heptadecyl, octadecyl, nonadecyl or eicosanyl.

Within the context of the present invention, definitions such as $C_2$-$C_{10}$-alkenyl, as for example defined above for the radicals $R^1$, $R^2$ and $R^3$ in formula (I) and $R^5$, $R^6$, $R^7$ and $R^8$ in formula (II), mean that this substituent (radical) is an alkenyl radical with a carbon atom number from 2 to 10. This carbon radical is preferably monounsaturated, but it can optionally also be di- or polyunsaturated. As regards linearity, branches, cyclic fractions and optionally present substituents, the analogous details as defined above with reference to the $C_1$-$C_{10}$-alkyl radicals are applicable. Preferably, within the context of the present invention, $C_2$-$C_{10}$-alkenyl is vinyl, 1-allyl, 3-allyl, 2-allyl, cis- or trans-2-butenyl or ω-butenyl.

Within the context of the present invention, the term "aryl", as for example defined above for the radicals $R^1$, $R^2$ and $R^3$ in formula (I) and $R^5$, $R^6$, $R^7$ and $R^8$ in formula (II), means that the substituent (radical) is an aromatic. The aromatic may be a monocyclic, bicyclic or optionally polycyclic aromatic. In the case of polycyclic aromatics, individual cycles can optionally be completely or partially saturated. Preferred examples of aryl are phenyl, naphthyl or anthracyl, in particular phenyl. The aryl radical can also optionally be mono- or polysubstituted with functional groups, as defined above for $C_1$-$C_{10}$-alkyl.

Within the context of the present invention, the term aralkyl, as for example defined above for the radicals $R^1$, $R^2$ and $R^3$ in formula (I) and $R^5$, $R^6$, $R^7$ and $R^8$ in formula (II), means that an alkyl radical (alkylene) is in turn substituted with an aryl radical. The alkyl radical may be for example a $C_1$-$C_{10}$-alkyl radical as per the above definitions.

In the above formula (I), the radical $R^1$ may be present once (m=1) or multiple times (m=2 or 3). The radical $R^1$ here can replace one or more hydrogen atoms on any desired carbon atoms of the cyclic lactam—corresponding to its frequency. If two or more radicals $R^1$ are present, these can be attached to the same carbon atom or to different carbon atoms. For m=0, the corresponding cyclic lactam is unsubstituted.

The support material is presented in more detail below.

In a preferred embodiment the support material comprises at least 90% by weight, more preferably at least 95% by weight and particularly at least 99% by weight of a polymer comprising polymerized units (A), (B) and optionally (C). In a particularly preferred embodiment the support material consists of a polymer comprising polymerized units (A), (B) and optionally (C).

In another preferred embodiment, the support material comprises a blend of a polymer comprising polymerized units (A), (B) and optionally (C) and of at least one homopolymer. The support material then comprises at least 50% by weight, preferably at last 60% by weight and particularly preferably at least 70% by weight of a polymer comprising polymerized units (A), (B) and optionally (C) and at most 50% by weight, preferably at most 40% by weight and particularly at most 30% by weight of at least one homopolymer.

"At least one homopolymer" within the context of the present invention means precisely one homopolymer and also a mixture of two or more homopolymers.

Any at least one homopolymer that can be extruded and blended with the polymer comprising polymerized units (A), (B) and optionally (C) is suitable. Preferably, the at least one hompolymer is selected from the group consisting of a homopolymer of component (A), the first monomer and a homopolymer of component (B), the second monomer. For the component (A) and the component (B), the embodiments and preferences described hereinafter hold true.

Another object of the present invention is therefore the use of a polymer comprising polymerized units (A) and (B):
(A) at least one first monomer of the formula (I):

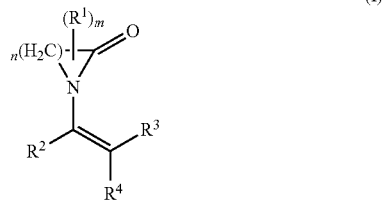

where
n is 3 to 12;
m is 0 to 3;
$R^1$ is $C_1$-$C_{10}$-alkyl, $C_2$-$C_{10}$-alkenyl, aryl or aralkyl;
$R^2$, $R^3$ and $R^4$ are each, independently of one another, hydrogen, $C_1$-$C_{10}$-alkyl, $C_2$-$C_{10}$-alkenyl, aryl or aralkyl; and
(B) at least one second monomer of the formula (II)

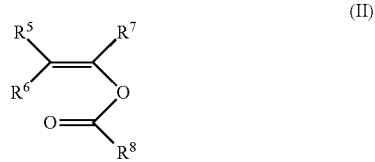

where
$R^5$, $R^6$ and $R^7$ are each, independently of one another, hydrogen, $C_1$-$C_{10}$-alkyl, $C_2$-$C_{10}$-alkenyl, aryl or aralkyl;
$R^8$ is $C_1$-$C_{20}$-alkyl, $C_2$-$C_{10}$-alkenyl, aryl or aralkyl;
and at least one homopolymer as support material in a fused filament fabrication process.
Component (A)/First Monomer
The terms "first monomer" and "component (A)" for the purpose of the present invention are synonymous and are used interchangeably throughout the present invention.
In a preferred embodiment component (A) is at least one monomer of the formula (I) where n is 3 to 5.
In another preferred embodiment component (A) is at least one monomer of the formula (I) where m is 0.
In another preferred embodiment component (A) is at least one monomer of the formula (I) where $R^2$, $R^3$ and $R^4$ are each hydrogen.
In a more preferred embodiment component (A) is at least one monomer selected from the group consisting of N-vinylpyrrolidone (N-vinyl-2-pyrrolidone), N-vinylpiperidone (N-vinyl-2-piperidone) and N-vinylcaprolactame.
Another object of the present invention is therefore the use of a polymer as a support material in a fused filament fabrication process, wherein the polymerized unit (A) comprises at least one monomer selected from the group consisting of N-vinylpyrrolidone, N-vinylpiperidone and N-vinylcaprolactame.
In a particular preferred embodiment component (A) is at least one monomer selected from the group consisting of N-vinylpyrrolidone and N-vinylcaprolactame.
In another preferred embodiment component (A) comprises at least 80% by weight, preferably at least 90% by weight, of N-vinylpyrrolidone and 0 to 20% by weight, preferably 0 to 10% by weight, of at least one monomer of the formula (I) which is different from N-vinylpyrrolidone, based on the total weight of component (A).

Another object of the present invention is therefore the use of a polymer as a support material in a fused filament fabrication process, wherein the polymerized unit (A) comprises at least 80% by weight of N-vinylpyrrolidone and 0 to 20% by weight of at least one monomer of the formula (I) which is different from N-vinylpyrrolidone, based on the total weight of component (A).

In a particular embodiment component (A) comprises at least 80% by weight, preferably at least 90% by weight, of N-vinylpyrrolidone and 0 to 20% by weight, preferably 0 to 10% by weight, of N-vinylcaprolactam, based on the total weight of component (A).

Another object of the present invention is therefore the use of a polymer as a support material in a fused filament fabrication process, wherein the polymerized unit (A) comprises at least 80% by weight of N-vinylpyrrolidone and 0 to 20% by weight of N-vinylcaprolactam, based on the total weight of component (A).

Suitable weight ranges for the at least one monomer of the formula (I) which is different from N-vinylpyrrolidone are 1 to 20% by weight, preferably 1 to 10% by weight, based on the total weight of component (A).

Suitable weight ranges for N-vinylcaprolactam are 1 to 20% by weight, preferably 1 to 10% by weight, based on the total weight of component (A).

In a preferred embodiment component (A) consists of N-vinylpyrrolidone.

Component (B)/Second Monomer
The terms "second monomer" and "component (B)" for the purpose of the present invention are synonymous and are used interchangeably throughout the present invention.

In a preferred embodiment component (B) is at least one monomer of the formula (II) where $R^5$, $R^6$ and $R^7$ are each hydrogen.

In another preferred embodiment component (B) is at least one monomer of the formula (II) where $R^8$ is $C_1$-$C_{20}$-alkyl.

In another preferred embodiment component (B) is at least one monomer of the formula (II) where $R^5$, $R^6$ and $R^7$ are each hydrogen and $R^8$ is $C_1$-$C_{20}$-alkyl.

In another preferred embodiment component (B) comprises at least 80% by weight, preferably at least 90% by weight, of vinyl acetate and 0 to 20% by weight, preferably 0 to 10% by weight, of at least one monomer of the formula (II) which is different from N-vinyl acetate, based on the total weight of component (B).

Another object of the present invention is therefore the use of a polymer as a support material in a fused filament fabrication process, wherein the polymerized unit (B) comprises at least 80% by weight of vinyl acetate and 0 to 20% by weight of at least one monomer of the formula (II) which is different from N-vinyl acetate, based on the total weight of component (B).

In a particular embodiment component (B) comprises at least 80% by weight, preferably at least 90% by weight, of vinyl acetate and 0 to 20% by weight, preferably 0 to 10% by weight, of at least one monovinyl ester of a $C_4$ to $C_{20}$ monocarboxylic acid, based on the total weight of component (B).

Another object of the present invention is therefore the use of a polymer as a support material in a fused filament fabrication process, wherein the polymerized unit (B) comprises at least 80% by weight of vinyl acetate and 0 to 20% by weight of at least one monovinyl ester of a $C_4$ to $C_{20}$ monocarboxylic acid, based on the total weight of component (B).

Suitable weight ranges for the at least one monomer of the formula (II) which is different from vinyl acetate are 1 to 20% by weight, preferably 1 to 10% by weight, based on the total weight of component (B).

Suitable weight ranges for the at least one monovinyl ester of a $C_4$ to $C_{20}$ monocarboxylic acid are 1 to 20% by weight, preferably 1 to 10% by weight, based on the total weight of component (B). Preferred are monovinyl esters of a $C_5$ to $C_{15}$, more preferable $C_8$ to $C_{12}$ and in particular $C_9$ to $C_{10}$ monocarboxylic acids.

In a preferred embodiment component (B) consists of vinyl acetate.

The polymer which is used as a support material preferably comprises at least 20% by weight of the polymerized unit (A), based on the total weight of the polymer (which is used as a support material).

Therefore, another object of the present invention is the use of a polymer comprising polymerized units (A) and (B) as a support material in a fused filament fabrication process, wherein the polymer comprises at least 20% by weight of the polymerized unit (A), based on the total weight of the polymer.

Another object of the present invention is therefore the use of a polymer as a support material in a fused filament fabrication process, wherein the polymer comprises at least 20% by weight of the polymerized unit (A), based on the total weight of the polymer.

In another preferred embodiment the polymer which is used as support material preferably comprises 20 to 80% by weight of the polymerized unit (A) and 80 to 20% by weight of the polymerized unit (B), based on the total weight of the polymer (which is used as a support material).

Therefore, another object of the present invention is the use of a polymer comprising polymerized units (A) and (B) as a support material in a fused filament fabrication process, wherein the polymer comprises 20 to 80% by weight of the polymerized unit (A) and 80 to 20% by weight of the polymerized unit (B), based on the total weight of the polymer.

Another object of the present invention is therefore the use of a polymer as a support material in a fused filament fabrication process, wherein the polymer comprises 20 to 80% by weight of the polymerized unit (A) and 80 to 20% by weight of the polymerized unit (B), based on the total weight of the polymer.

The polymer which is used as a support material can optionally contain a polymerized unit (C).

In a preferred embodiment the polymer which is used as support material preferably comprises 20 to 80% by weight of polymerized N-vinylpyrrolidone (unit (A)) and 80 to 20% by weight of polymerized vinyl acetate (unit (B)) and 0 to 40% by weight, preferably 0 to 20% by weight more preferably 0 to 10% by weight of a polymerized unit (C), based on the total weight of the polymer (which is used as a support material).

In case a polymerized unit (C) is present the lower limit is at least 0.1% by weight, preferable at least 1% by weight and more preferable at least 5% by weight, based on the total weight of the polymer (which is used as a support material).

The total weight of the polymerized units (A), (B) and optionally (C) generally sum up to 100% by weight.

The polymerized unit (C) is preferably at least one third monomer selected from the group consisting of acrylic acids, and substituted acrylic acids, and salts, esters and amides thereof, where the substituents on the carbon atoms are in the two or three position of the acrylic acid, and independently of one another are chosen from the group consisting of $C_1$-$C_{20}$-alkyl, —CN, COOH, particularly preferably methacrylic acid, ethacrylic acid, acrylamide, methacrylamide, N,N-dimethylacrylamide and N,N-dimethylmethacrylamide. Further suitable monomers are amides of acrylic acid and derivatives thereof, such as ethacrylamide, N-methylacrylamide, N-ethylacrylamide, N-isopropylacrylamide, N-butylacrylamide, N-t-butylacrylamide, N-octylacrylamide, N-t-octylacrylamide, N-octadecylacrylamide, N-phenylacrylamide, N-methylmathacrylamide, N-ethylmethacrylamide, N-isopropylmethacrylamide, N-dodecylmethacrylamide, N-[3-(dimethylamino)propyl]methacrylamide, N-[3-(dimethylamino)propyl]acrylamide, N-[3-(dimethylamino)butyl]methacrylamide, N-[8-(dimethylamino)octyl]nethacrylamide, N-[12-(dimethylamino)dodecyl]methacrylamide, N-[3-(diethylamino)propyl]methacrylamide, N-[3-(diethylamino)propyl]acrylamide, unsaturated sulfonic acids, such as, for example, acrylamidopropansulfonic acid; 3-cyanoacrylic acid. Esters of acrylic acid and derivatives thereof, such as methyl acrylate, ethyl acrylate, propyl acrylate, n-butyl acrylate, isobutyl acrylate, t-butyl acrylate, 2-ethylhexyl acrylate, decyl acrylate, methyl methacrylate, ethyl methacrylate, propyl methacrylate, n-butyl methacrylate, isobutyl methacrylate, t-butyl methacrylate, 2-ethylhexyl methacrylate, decyl methacrylate, stearyl (meth)acrylate, 2,3-dihydroxypropyl acrylate, 2,3-dihydroxypropyl methacrylate, 2-hydroxyethyl acrylate, hydroxypropyl acrylates, 2-hydroxyethyl methacrylate, 2-hydroxyethyl ethacrylate, 2-methoxyethyl acrylate, 2-methoxyethyl methacrylate, 2-methoxyethyl ethacrylate, 2-ethoxyethyl methacrylate, 2-ethoxyethyl ethacrylate, hydroxypropyl methacrylates, glyceryl monoacrylate, glyceryl monomethacrylate, polyalkylene glycol (meth)acrylates, N,N-dimethylaminomethyl (meth)acrylate, N,N-diethylaminomethyl (meth)acrylate, N,N-dimethylaminoethyl (meth)acrylate, N,N-diethylaminoethyl (meth)acrylate, N,N-dimethylaminobutyl (meth)acrylate, N,N-diethylaminobutyl (meth)acrylate, N,N-dimethylaminohexyl (meth)acrylate, N,N-dimethylaminooctyl (meth)acrylate, N,N-dimethylaminododecyl (meth)acrylate.

Other suitable monomers for the polymerized unit (C) are heterocyclic compounds preferably vinylpyridine, vinyloxazoline and N-vinylimidazoles. Preferred heterocyclic compounds are 1-vinylimidazol, 2-methyl-1-vinylimidazol, 3-methyl-1-vinylimidazolium chloride and 3-methyl-1-vinylimidazolium methylsulfate.

The polymer comprising polymerized units (A), (B) and optionally (C) which is used as a support material in a fused filament fabrication process can be obtained by free-radical polymerization of monomers (A), (B) and optionally (C) described above. Suitable reaction conditions are disclosed in the documents U.S. Pat. No. 6,803,405 and EP 0 688 799 which are incorporated into the present invention by reference.

Suitable polymers which are used as support materials according to the present invention have generally glass transition temperatures in the range of 40 to 200° C., preferably in the range of 50 to 180° C., more preferably in the range of 60 to 160° C. and particularly in the range of 80 to 150° C.

Another object of the present invention is therefore the use of a polymer as a support material in a fused filament fabrication process, wherein the polymer has a glass transition temperature in the range of 40 to 200° C.

Consequently, the polymers which are used as support materials have glass transition temperatures similar to that of modeling materials generally used in FFF processes.

Glass transition temperatures for the purpose of the invention are measured by differential scanning calorimetry (DSC) according to DIN 53765. Glass transition temperatures were determined using a TA Instruments Q2000. A temperature ramp speed of 20 K/min was used.

Normally the glass transition temperature of the polymer which is used as support material according to the invention has a glass transition temperature not more than 25° C. lower than the modeling material. The polymer which is used as support material is not hygroscopic and shows minimal water uptake.

The polymer which is used as support material according to the invention generally as a mass average molecular mass (Mw) in the range of 30 to 1000 kg/mol, preferably in the range of 40 to 900 kg/mol and more preferably in the range of 60 to 800 kg/mol.

Another object of the present invention is therefore the use of a polymer as a support material in a fused filament fabrication process, wherein the polymer has a mass average molecular (Mw) in the range of 30 to 1000 kg/mol.

The weight average molecular mass (Mw) according to the invention is measured by gel permeation chromatography (GPC) with hexafluoro-2-propanol as eluent. Weight average molecular weights (Mw) according to the invention are determined by gel permeation chromatography using polymethyl methacrylate standards (PSS Polymer standards services GmbH). The measurements were performed at an oven temperature of 40° C. with hexafluoroisopropanol (HFIP, with 0.05 wt % trifluoroacetic acid sodium salt). A HFIP-LG guard column in combination with two HFIPgel columns (i.D. of 7.5 mm and length of 30 cm) (Polymer Laboratories Ltd.) were used, along with a RI detector.

The polymer which is used as support material according to the invention shows a good solubility in water and can therefore be easily removed from the three-dimensional object.

The polymer which is used as support material according to the invention shows significantly shorter times for solubilisation compared to support materials described in the state of the art.

The time for solubilisation of the polymer which is used as a support material according to the invention in distilled water at a temperature of 20° C. is in the range of 0.2 to 20 minutes, preferably in the range of 0.5 to 18 minutes, more preferably in the range of 0.5 to 15 minutes and particularly in the range of 0.5 to 10 minutes.

The time for solubilisation of the polymer which is used as a support material according to the invention in an aqueous solution consisting of distilled water and 0.1M NaOH at a temperature of 20° C. is in the range of 0.1 to 19 minutes, preferably in the range of 0.1 to 17 minutes, more preferably in the range of 0.1 to 15 minutes and particularly in the range of 0.5 to 10 minutes.

The time for solubilisation of the polymer which is used as a support material according to the present invention is measured in distilled water or in an aqueous solution consisting of distilled water and 0.1M NaOH at a temperature of 20° C. Therefore 0.25 g of the polymer is placed in 50 ml of distilled water or an aqueous solution consisting of distilled water and 0.1M NaOH, respectively. The time required until no undissolved polymer remains is measured and is taken as the time for solubilisation. In some cases the solution turns turbid.

The polymer which is used as a support material according to the invention shows excellent viscosities for fused filament fabrication processes. The viscosity of the polymer which is used as a support material according to the invention is in the range of 1 to 10 000 Pa*s, preferably in the range of 2 to 7 000 Pa*s and more preferably in the range of 2 to 5 000 Pa*s, measured at a temperature of 240° C. at a shear rate of 10 rad/s.

Another object of the present invention is therefore the use of a polymer as a support material in a fused filament fabrication process, wherein the viscosity of the polymer is in the range of 1 to 10 000 Pa*s, measured at 240° C. at a shear rate of 10 rad/s.

The viscosity is measured by means of rotation rheology measurements using a plate-plate configuration on a DHR-1 TA Instruments rotational rheometer. A frequency sweep was performed between 0.06 and 400 rad/s) at a temperature of 240° C.

In a preferred embodiment the polymer which is used as a support material according to the invention comprises
20 to 80% by weight of polymerized unit (A) consisting of N-vinylpyrrolidone and
80 to 20% by weight of polymerized unit (B) consisting of vinyl acetate,
based on the total weight of the polymer.

Another object of the present invention is therefore the use of a polymer as a support material in a fused filament fabrication process, wherein the polymer comprises 20 to 80% by weight of polymerized unit (A) consisting of N-vinylpyrrolidone and 80 to 20% by weight of polymerized unit (B) consisting of vinyl acetate, based on the total weight of the polymer.

In another preferred embodiment the polymer which is used as a support material according to the invention comprises
20 to 80% by weight of polymerized unit (A) consisting of N-vinylpyrrolidone,
80 to 20% by weight of polymerized unit (B) consisting of vinyl acetate and
1 to 10% by weight of polymerized unit (C) consisting of N-vinylcaprolactam
based on the total weight of the polymer.

Another object of the present invention is therefore the use of a polymer as a support material in a fused filament fabrication process, wherein the polymer comprises 20 to 80% by weight of polymerized unit (A) consisting of N-vinylpyrrolidone, 80 to 20% by weight of polymerized unit (B) consisting of vinyl acetate and 1 to 10% by weight of a polymerized unit (C) consisting of N-vinylcaprolactam, based on the total weight of the polymer.

In another preferred embodiment the polymer which is used as a support material according to the invention comprises
20 to 80% by weight of polymerized unit (A) consisting of N-vinylpyrrolidone,
80 to 20% by weight of polymerized unit (B) consisting of vinyl acetate and
1 to 10% by weight of polymerized unit (C) consisting of at least one monovinyl ester of the formula (III)

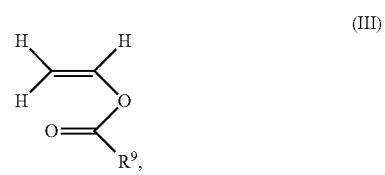

(III)

where $R^9$ is $C_3$-$C_{20}$-alkyl, preferable $C_4$-$C_{15}$-alkyl and particularly $C_8$-$C_{12}$-alkyl,
based on the total weight of the polymer.

Another object of the present invention is therefore the use of a polymer as a support material in a fused filament fabrication process, wherein the polymer comprises 20 to 80% by weight of polymerized unit (A) consisting of N-vinylpyrrolidone, 80 to 20% by weight of polymerized unit (B) consisting of vinyl acetate and 1 to 10% by weight of a polymerized unit (C) consisting of at least one monovinyl ester of the formula (III)

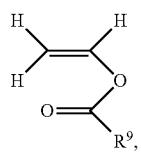

where $R^9$ is $C_3$-$C_{20}$-alkyl,
based on the total weight of the polymer.

In another preferred embodiment the polymer which is used as a support material according to the invention comprises 20 to 80% by weight of polymerized unit (A) consisting of N-vinylpyrrolidone, 80 to 20% by weight of polymerized unit (B) consisting of vinyl acetate and 1 to 10% by weight of polymerized unit (C) consisting of one monovinyl ester of the formula (III)

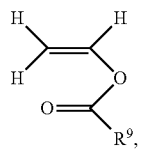

where $R^9$ is $C_3$-$C_{20}$-alkyl, preferable $C_4$-$C_{15}$-alkyl and particularly $C_8$-$C_{12}$-alkyl,
based on the total weight of the polymer.

In a preferred embodiment the polymer which is used as a support material according to the invention consists of 20 to 80% by weight of polymerized unit (A) consisting of N-vinylpyrrolidone and 80 to 20% by weight of polymerized unit (B) consisting of vinyl acetate,
based on the total weight of the polymer.

In another preferred embodiment the polymer which is used as a support material according to the invention consists of 20 to 80% by weight of polymerized unit (A) consisting of N-vinylpyrrolidone, 80 to 20% by weight of polymerized unit (B) consisting of vinyl acetate and 1 to 10% by weight of polymerized unit (C) consisting of N-vinylcaprolactam based on the total weight of the polymer.

In another preferred embodiment the polymer which is used as a support material according to the invention consists of 20 to 80% by weight of polymerized unit (A) consisting of N-vinylpyrrolidone, 80 to 20% by weight of polymerized unit (B) consisting of vinyl acetate and 1 to 10% by weight of polymerized unit (C) consisting of at least one monovinyl ester of the formula (III)

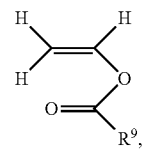

where $R^9$ is $C_3$-$C_{20}$-alkyl, preferable $C_4$-$C_{15}$-alkyl and particularly $C_8$-$C_{12}$-alkyl,
based on the total weight of the polymer.

In another preferred embodiment the polymer which is used as a support material according to the invention consists of 20 to 80% by weight of polymerized unit (A) consisting of N-vinylpyrrolidone, 80 to 20% by weight of polymerized unit (B) consisting of vinyl acetate and 1 to 10% by weight of polymerized unit (C) consisting of one monovinyl ester of the formula (III)

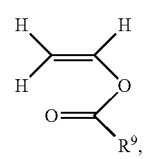

where $R^9$ is $C_3$-$C_{20}$-alkyl, preferable $C_4$-$C_{15}$-alkyl and particularly $C_8$-$C_{12}$-alkyl,
based on the total weight of the polymer.

Process for Producing a Three-Dimensional Object

The above mentioned embodiments and preferences in respect of the modeling material, the support material and the polymer comprising polymerized units (A), (B) and optionally (C) apply analogously to the process for producing the three-dimensional object.

The FFF process for the production of three-dimensional objects is well known in the state of the art and detailed explained in the above cited documents. The FFF process is also denominated as 3D printing process.

According to step i) the support material is deposited into a build chamber. Therefore the support material is provided in a solid state. Subsequently the support material is provided to a nozzle and heated to a temperature past the glass transition temperature of the support material and then deposited. The support material in the solid state can be provided in form of a filament, as well as in granulate or powder form.

According to step ii) the modeling material is deposited into a build chamber. Therefore the modeling material is provided in a solid state. Subsequently the modeling material is provided to a second nozzle and heated to a temperature past the glass transition temperature of the modeling material and then deposited. The modeling material in the solid state can be provided in form of a filament, as well as in granulate or powder form.

The FFF process for example can be carried out by the sequential discharging of discontinuous drops of a solidifiable material. The solidifiable material is plasticized in the fluid phase and is introduced into a material store having at least one discharging unit which can be clocked. From there, the material is discharged in a dropwise manner by means of a discharging unit in the direction of an object carrier for an object, wherein the object carrier and an outlet opening can be moved at a relative spacing in relation to one another in space in order to influence the drop shape. The creation of the drops is supported by changing the relative spacing in an alternating manner in opposite directions during the discharging of the drops from the discharging unit and during the application of the drops to the three-dimensional object during the production of the object. This process is described in WO 2012/028308.

In other words in steps i) and ii) of the inventive process the modeling material and the support material are each initially present in a solid state and thereafter melted and printed to form an three-dimensional object comprising the modeling material, which is supported by the support material. Subsequently the support material is removed in step iii) by dissolving in an aqueous solution to obtain the three-dimensional object itself.

In other words in steps i) and ii) of the inventive process the modeling material and the support material are each initially present in a solid state in form of a filament, a granulate or a powder and thereafter melted and printed to form an three-dimensional object comprising the modeling material, which is supported by the support material. Subsequently the support material is removed in step iii) by dissolving in an aqueous solution to obtain the three-dimensional object itself.

In step iii) the three-dimensional object comprising the modeling material and the support material is brought in contact with the aqueous solution. The three-dimensional object comprising the modeling material and the support material therefore can simply be placed in a bath comprising the aqueous solution.

The aqueous solution normally has a pH value in the range of 6 to 9, preferably 6 to 8.

The temperature of the aqueous solution in step iii) is normally in the range of 10 to 100° C., preferably in the range of 15 to 90° C. and more preferably in the range of 20 to 80° C.

Surprisingly the support material has a sufficient rate of dissolution and can be easily removed from the three-dimensional object.

As aqueous solution in a preferred embodiment tap water or distilled water is used.

The present invention is illustrated below by reference to examples, without limitation thereto.

The following polymers where tested:

Comparative example 1 (C1): acrylic copolymer; trade name P400 SR obtained from Stratasys.

Comparative example (C2): N-vinylpyrrolidone K30 homopolymer

Comparative example (C3): N-vinylpyrrolidone K90 homopolymer

Inventive example (E4): Copolymer comprising polymerized units of N-vinylpyrrolidone and vinyl acetate Inventive example (E5): Copolymer comprising polymerized units of N-vinylpyrrolidone, vinyl acetate and a monovinyl ester of a $C_4$ to $C_{20}$ monocarboxylic acid The weight average molecular weights (Mw) where determined by gel permeation chromatography using polymethyl methacrylate standards (PSS Polymer standards services GmbH). The measurements were performed at an oven temperature of 40° C. with hexafluoroisopropanol (HFIP, with 0.05 wt % trifluoroacetic acid sodium salt). A HFIP-LG guard column in combination with two HFIPgel columns (i.D. of 7.5 mm and length of 30 cm) (Polymer Laboratories Ltd.) were used, along with a RI detector.

The viscosity of the polymers was measured at a temperature of 240° C. at a shear rate of 10 rad/s by means of rotation rheology measurements using a plate-plate configuration on a DHR-1 TA Instruments rotational rheometer. A frequency sweep was performed between 0.06 and 400 rad/s at a temperature of 240° C.

The glass transition temperatures ($T_g$) were measured by differential scanning calorimetry (DSC) according to DIN 53765 using a TA Instruments Q2000 and a temperature ramp speed of 20K/min.

The time for solubilisation was measured in distilled water or in an aqueous solution consisting of distilled water and 0.1M NaOH at a temperature of 20° C. Therefore 0.25 g of the polymer was placed in 50 ml of distilled water or an aqueous solution consisting of distilled water and 0.1M NaOH, respectively. The time required until no undissolved polymer remains was measured and was taken as the time for solubilisation.

The results are shown below in table 1.

TABLE 1

| Example | $M_w$ [kg/mol] | Viscosity at 10 rad/s [Pa*s] | $T_g$ [° C.] | Time for solubilisation [min] | |
|---|---|---|---|---|---|
| | | | | Water | 0.1M NaOH |
| C1 | 140 | 835 | 94.5 | insoluble | 30 |
| C2 | 50 | 9000 | 168 | 4 | 0.5 |
| C3 | 1400 | 10000 | 176 | 4 | 3 |
| E4 | 40 | 13 | 107 | 2.5 | 0.5 |
| E5 | 190 | 1650 | 112 | 17 | 16 |

The polymers according to the invention (examples E4 and E5) show glass transition temperatures ($T_g$) similar to that of conventionally used modeling materials. The viscosities of the polymers according to the invention make these polymers ideal for the use in a fused filament fabrication process. Moreover, the time for solubilisation is significantly shortened compared to support materials described in the state of the art.

The polymer according to comparative example C1 shows a suitable viscosity to be used in a fused filament fabrication process; however in water it is insoluble so that the removement of this support material is difficult. The polymers according to comparative examples C2 and C3 show good solubilisation times; however the high viscosities make them difficult to process. Moreover, these polymers are highly hygroscopic and therefore difficult to store.

As shown above the polymers according to the invention meet at one and the same time the requirements of high glass transition temperature, good compatibility with the modeling material, suitable viscosity and easy removability.

Table 2 gives results for blends of the support material used in comparative example (C3) and the support material used in inventive example E4, namely a blend of a N-vinylpyrrolidone K90 homopolymer (C3) and a copolymer comprising polymerized units of N-vinylpyrrolidone and vinylacetate (E4).

Three-Point Bending Test

Unnotched charpy bars with dimensions (10×4×8 mm) were injected after processing the buffered polymer on a DSM mini-extruder. The polymer was extruded twice for 2 min each using a screw-speed of 80 rpm. These were bars used as test specimens to determine the flexural modulus as well as the stress and elongation at break in flexural tension using an ISO 178:2010 test. The flex-rate was set at 2 mm/min. The tests were performed at room temperature (23° C.).

TABLE 2

| Example | Content C3 [wt %] | Content E4 [wt %] | Mw [kg/mol] | Viscosity at 10 rad/s [Pa·s] | Tg [° C.] | Flexural mechanical properties | |
|---|---|---|---|---|---|---|---|
| | | | | | | Flexural modulus [MPa] | Elongation at break [%] |
| E6 | 10 | 90 | 126 | 300 | 105 | 3642 | 0.7 |
| E7 | 20 | 80 | 176 | 366 | 105 | 3660 | 1.07 |
| E8 | 30 | 70 | 246 | 575 | 106 | 3712 | 0.96 |

The inventive examples E6, E7 and E8 show the good mechanical properties of the blends. They show a high stiffness together with a glass transition temperature ($T_g$) and a viscosity that are ideal for the use in a fused filament fabrication process.

The invention claimed is:

1. A process for producing a three-dimensional solid object, the process comprising:
   i) depositing a support material into a build chamber with a layer-based additive technique to form a solid support structure;
   ii) depositing a modeling material into the build chamber with the layer-based additive technique to form the three-dimensional solid object, wherein the three-dimensional solid object comprises at least one region supported by the solid support structure; and
   iii) removing the solid support structure from the three-dimensional solid object with an aqueous solution,
   wherein each layer deposited with a layer-based additive technique is solidified before depositing each additional layer thereon; and
   wherein the support material comprises a polymer comprising polymerized units (A) and (B):
   (A) at least one first monomer of formula (I):

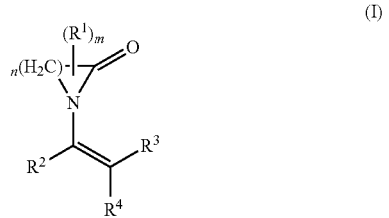

where
   n is 3 to 12;
   m is 0 to 3;
   $R^1$ is $C_1$-$C_{10}$-alkyl, $C_2$-$C_{10}$-alkenyl, aryl or aralkyl;
   $R^2$, $R^3$ and $R^4$ are each, independently of one another, hydrogen, $C_1$-$C_{10}$-alkyl, $C_2$-$C_{10}$-alkenyl, aryl or aralkyl; and
   (B) at least one second monomer of formula (II)

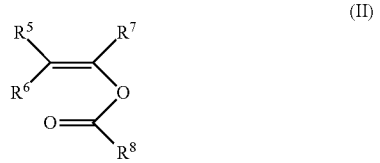

where
   $R^5$, $R^6$ and $R^7$ are each, independently of one another, hydrogen, $C_1$-$C_{10}$-alkyl, $C_2$-$C_{10}$-alkenyl, aryl or aralkyl;
   $R^8$ is $C_1$-$C_{20}$-alkyl, $C_2$-$C_{10}$-alkenyl, aryl or aralkyl.

2. The process according to claim 1, wherein the polymer comprises at least 20% by weight of polymerized unit (A), based on the total weight of the polymer.

3. The process according to claim 1, wherein the polymer comprises
   20 to 80% by weight of polymerized unit (A) and
   80 to 20% by weight of polymerized unit (B),
   based on the total weight of the polymer.

4. The process according to claim 1, wherein polymerized unit (A) comprises at least one monomer selected from the group consisting of N-vinylpyrrolidone, N-vinylpiperidone, and N-vinylcaprolactame.

5. The process according to claim 1, wherein polymerized unit (A) comprises
   at least 80% by weight of N-vinylpyrrolidone, and
   0 to 20% by weight of at least one monomer of formula (I) which is different from N-vinylpyrrolidone,
   based on the total weight of component (A).

6. The process according to claim 1, wherein polymerized unit (A) comprises
   at least 80% by weight of N-vinylpyrrolidone, and
   0 to 20% by weight of N-vinylcaprolactam,
   based on the total weight of component (A).

7. The process according to claim 1, wherein polymerized unit (B) comprises
   at least 80% by weight of vinyl acetate, and
   0 to 20% by weight of at least one monomer of formula (II) which is different from N-vinyl acetate,
   based on the total weight of component (B).

8. The process according to claim 1, wherein polymerized unit (B) comprises
   at least 80% by weight of vinyl acetate, and
   0 to 20% by weight of at least one monovinyl ester of a $C_4$ to $C_{20}$ monocarboxylic acid,
   based on the total weight of component (B).

9. The process according to claim 1, wherein the polymer has a mass average molecular (Mw) in the range of 30 to 1000 kg/mol.

10. The process according to claim 1, wherein the polymer has a glass transition temperature in the range of 40 to 200° C.

11. The process according to claim 1, wherein the viscosity of the polymer is in the range of 1 to 10,000 Pa·s, measured at 240° C. at a shear rate of 10 rad/s.

12. The process according to claim 1, wherein the polymer comprises:
   20 to 80% by weight of polymerized unit (A) consisting of N-vinylpyrrolidone and
   80 to 20% by weight of polymerized unit (B) consisting of vinyl acetate,
   based on the total weight of the polymer.

13. The process according to claim 1, wherein the polymer comprises
   20 to 80% by weight of polymerized unit (A) consisting of N-vinylpyrrolidone,
   80 to 20% by weight of polymerized unit (B) consisting of vinyl acetate and
   1 to 10% by weight of a polymerized unit (C) consisting of N-vinylcaprolactam,
   based on the total weight of the polymer.

14. The process according to claim 1, wherein the polymer comprises
   20 to 80% by weight of polymerized unit (A) consisting of N-vinylpyrrolidone,
   80 to 20% by weight of polymerized unit (B) consisting of vinyl acetate and
   1 to 10% by weight of a polymerized unit (C) consisting of at least one monovinyl ester of formula (III)

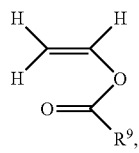

(III)

where $R^9$ is a $C_3$-$C_{20}$-alkyl,
based on the total weight of the polymer.

15. A fused filament fabrication process, the process comprising:
depositing a modeling material into a build chamber with a layer-based additive technique to form a three-dimensional structure around a solid support material preformed in the build chamber,
   wherein the solid support material comprises a polymer comprising polymerized units (A) and (B):

(A) at least one first monomer of formula (I):

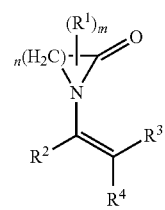

(I)

where
n is 3 to 12;
m is 0 to 3;
$R^1$ is $C_1$-$C_{10}$-alkyl, $C_2$-$C_{10}$-alkenyl, aryl or aralkyl;
$R^2$, $R^3$ and $R^4$ are each, independently of one another, hydrogen, $C_1$-$C_{10}$-alkyl, $C_2$-$C_{10}$-alkenyl, aryl or aralkyl; and (B) at least one second monomer of formula (II)

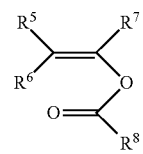

(II)

where
$R^5$, $R^6$ and $R^7$ are each, independently of one another, hydrogen, $C_1$-$C_{10}$-alkyl, $C_2$-$C_{10}$-alkenyl, aryl or aralkyl; and
$R^8$ is $C_1$-$C_{20}$-alkyl, $C_2$-$C_{10}$-alkenyl, aryl or aralkyl.

* * * * *

UNITED STATES PATENT AND TRADEMARK OFFICE
CERTIFICATE OF CORRECTION

PATENT NO. : 10,421,269 B2
APPLICATION NO. : 15/120051
DATED : September 24, 2019
INVENTOR(S) : Marie-Claire Hermant et al.

Page 1 of 1

It is certified that error appears in the above-identified patent and that said Letters Patent is hereby corrected as shown below:

On the Title Page

Column 2, item [57], Line 10, "$C_2$-$C_{10}$alkenyl," should read -- $C_2$-$C_{10}$-alkenyl, --.

In the Specification

Column 6, Line 63, "hompolymer" should read -- homopolymer --.

Column 7, Line 55, "N-vinylcaprolactame." should read -- N-vinylcaprolactam. --.

Column 7, Lines 60-61, "N-vinylcaprolactame." should read -- N-vinylcaprolactam. --.

Column 7, Line 64, "N-vinylcaprolactame." should read -- N-vinylcaprolactam. --.

Column 10, Line 12, "N-methylmathacrylamide," should read -- N-methylmethacrylamide, --.

Column 10, Line 18, "nethacrylamide," should read -- methacrylamide, --.

In the Claims

Column 18, Line 24, Claim 4, "N-vinylcaprolactame." should read -- N-vinylcaprolactam. --.

Signed and Sealed this
Seventeenth Day of March, 2020

Andrei Iancu
*Director of the United States Patent and Trademark Office*